2 Sheets—Sheet 1.
M. NEWTON.
Check-Rower.
No. 196,537          Patented Oct. 30, 1877.
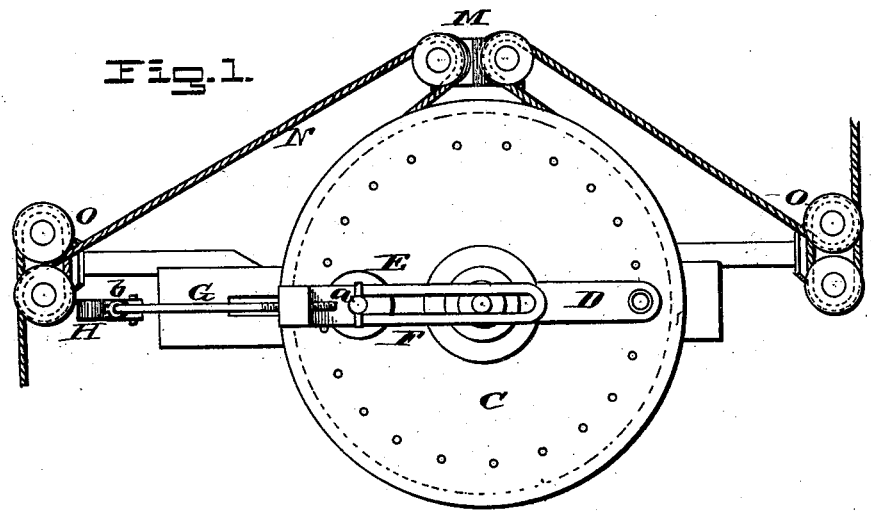
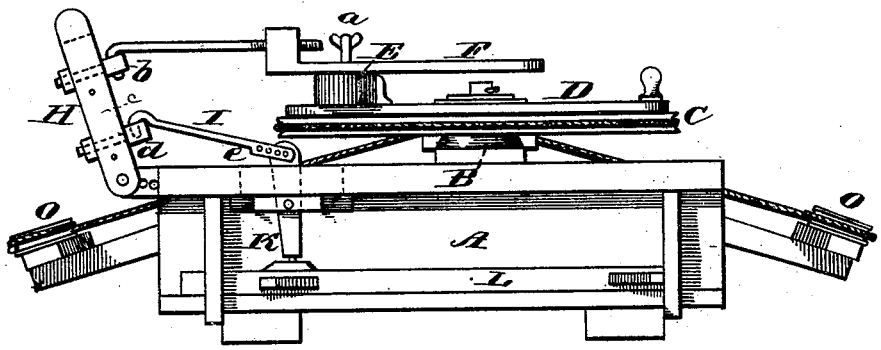
WITNESSES:
Jas. F. DuHamel.
N. H. Cobb.
INVENTOR:
Madison Newton.
PER
H. T. Abbot.
ATTORNEY.

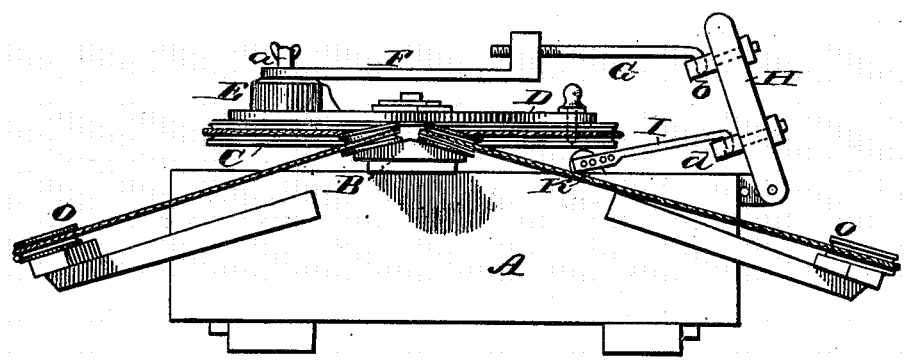

UNITED STATES PATENT OFFICE.

MADISON NEWTON, OF KENTLAND, INDIANA.

IMPROVEMENT IN CHECK-ROWERS.

Specification forming part of Letters Patent No. 196,537, dated October 30, 1877; application filed April 2, 1877.

*To all whom it may concern:*

Be it known that I, MADISON NEWTON, of Kentland, in the county of Newton and State of Indiana, have invented certain new and useful Improvements in Check-Rowers; and I do hereby declare that the following is a full, clear, and exact description thereof, which will enable others skilled in the art to which it appertains to make and use the same.

The invention consists in a novel construction of the connection between the eccentric upon the operating-wheel and the handle of the planter, whereby various adjustments may be had to obtain the length of stroke necessary in different planters to which the rower is applied, and whereby, also, is insured correct or equal dropping on both sides when the rower attachment is not centered exactly.

The invention also consists in placing the side cord-pulleys in a plane below the front pulleys, so that the cord shall ascend to said front pulleys from the side pulleys at an angle, whereby I overcome any jerking of the cord by reason of the planter going over uneven ground, or from other causes, and consequently insure correct or equal parallel hills.

In the drawings illustrating my invention, Figure 1 is a top-plan view; Fig. 2, a rear elevation, exposing the interior of the hopper to view; Fig. 3, a front elevation; and Fig. 4, an edge view of the lever, hereinafter described.

A represents the seed-hopper of a corn-planter, to the upper portion of which may be attached a frame, B. One end of this frame B is adapted to receive the pivot or shaft of the pulley-wheel C, which wheel revolves on said pivot or shaft, and has a circular series of holes and a grooved periphery. D is the eccentric or bar, fulcrumed upon the pivot of the wheel C, and adjustable upon said wheel radially by a pin passing through one of its ends into one of the series of holes in the wheel, and capable of entire disconnection with said wheel. The other end of this eccentric bears a wrist, E, and pin $a$, upon and by which, respectively, rests and is secured a slotted bar, F. This bar has secured to its outer end a rod, G, whose connecting end may be screw-threaded, so as to be capable of adjustment on the bar F, as shown, and its other end is adapted to be connected with a lever, H. The connection of the rod G and lever H is by means of an eye, $b$, which is adjustable upon said lever, so as to vary the length of the lever with respect of the rod G, and this adjustability may be accomplished by securing said eye in a slot, $c$, in said lever. The lever H is pivoted at its lower end. Near the lower end of the lever, and adjustable upon it, is an eye, $d$, from which eye a rod, I, extends to a lever, H, pivoted centrally and connected with the slide L of the hopper. The connection between the lever K and rod I is adjustable, as indicated at $e$, Fig. 2.

N is the cord passing around the wheel C, over pulleys M at the front of the driver, and in about the same plane as the wheel, and over pulleys O, placed below the wheel, and pulleys M, and on either side thereof, so that the cord ascends from said pulleys O at an angle to the pulleys M and wheel C.

The operation is as follows: As the wheel is rotated the eccentric is carried with it, and its wrist-pin $a$ will, at each complete revolution, move through the length of the slot in the bar F; but as such slot is not the length of the radius of said wheel, said bar will receive two longitudinal movements at each rotation of the wheel, whereby the lever H will be moved back of a vertical line, as in Fig. 2, and forward of such line, as in Fig. 3. This motion of the lever H will be communicated, through rod I, to the handle or lever K, and thence to the slide L, thereby dropping the seed at each end of the hopper. Now, the end gained by this construction is a quick, short motion, which is very effective. The length of the stroke may be varied by adjusting the eyes $b$ $d$ upon the lever H.

If the rower is not or cannot be exactly centered upon the dropper, correct or equal dropping on both sides is obtained by adjusting the rod G upon the bar F, and because of this feature of adjustability I denominate these two elements of my apparatus an "equalizer."

Where the cord passes over pulleys all on a level, or in the same plane, the rise and fall of the machine incident to the motion of the horse prevent the rower from operating uniformly by reason of the jerking action upon the cord; hence the hills will not be regular and equidistant. To overcome this evil I place the side pulleys below the level of the front pulleys and the wheel, and the cord ascending to said front pulleys effectually prevents this jerking from disturbing the regular action of the apparatus, and insures equidistant hills. These lower side pulleys operate most advantageously when placed at any angle to the plane of the front pulleys.

What I claim is—

1. The combination of the slotted bar F, the rotating pulley-wheel C, lever H, with adjustable connections, and handle of a corn-dropper, substantially as described.

2. The combination of the wheel C, eccentric or bar D, slotted bar F, lever H, and the handle of a corn-dropper, their connections being adjustable, substantially as described.

3. In a check-rower, the eccentric or bar D, rotating wheel C, equalizer F G, and lever H, in combination with a corn-dropper, substantially as described.

4. The side pulleys of a check-rower, arranged in a lower plane than the front pulleys thereof, in combination with the cord and rotating wheel, substantially as and for the purpose described.

In testimony that I claim the foregoing as my own I affix my signature in presence of two witnesses.

MADISON NEWTON.

Witnesses:
   JOHN B. SPOTSWOOD,
   PATRICK KEEFE.